United States Patent [19]

Shindo

[11] 3,888,634

[45] June 10, 1975

[54] PROCESS FOR PREPARATION OF A FILM OF LEAD MONOXIDE

[75] Inventor: Masanari Shindo, Tokyo, Japan

[73] Assignee: Konishiroku Photo Industry Co., Ltd., Tokyo, Japan

[22] Filed: Mar. 23, 1973

[21] Appl. No.: 344,221

[30] Foreign Application Priority Data

Mar. 27, 1972 Japan ................................ 47-29757

[52] U.S. Cl. ...................... 23/305; 23/300; 423/619

[51] Int. Cl. .......................... C01f 7/34; C22b 13/00

[58] Field of Search ...................... 23/305, 294, 300; 117/106 R; 423/619

[56] References Cited

UNITED STATES PATENTS

| | | | |
|---|---|---|---|
| 2,888,370 | 5/1959 | Damon et al. | 423/619 |
| 3,301,706 | 1/1967 | Flaschen et al. | 117/33.3 |
| 3,447,958 | 6/1969 | Okutsu et al. | 117/106 R |
| 3,497,382 | 2/1970 | Kwestroo et al. | 117/106 R |
| 3,499,785 | 3/1970 | Van Amstel | 117/106 R |

*Primary Examiner*—Norman Yudkoff
*Assistant Examiner*—D. Sanders
*Attorney, Agent, or Firm*—Bierman & Bierman

[57] ABSTRACT

This invention provides a process for the preparation of lead monoxide comprising subjecting lead monoxide to the vacuum evaporation in the presence of silicon dioxide. According to this process, it is possible to obtain a film of highly pure lead monoxide of the orthorhombic system excellent in semiconductive or photo-conductive characteristics very easily at a very low cost without conducting any special post treatment, while preventing incorporation of metallic lead formed by decomposition of lead monoxide.

11 Claims, No Drawings

PROCESS FOR PREPARATION OF A FILM OF LEAD MONOXIDE

BACKGROUND OF INVENTION

1. Field of Invention

This invention relates to a process for the preparation of a film of lead monoxide. More particularly, the invention relates to a process for the preparation of a film of lead monoxide of high purity by vacuum evaporation.

2. Description of Prior Art

It has been known that lead monoxide includes two crystal types, one being an α-type of the tetragonal system having a red color and the other being a β-type of the orthorhombic system having a yellow color and each type has a semiconductive or photo-conductive property.

It has also been known that the α-type of lead monoxide especially has a high resistivity and is suitably used as a semiconductor or photo-conductor. However, in order to allow lead monoxide to exhibit the properties as a semiconductor or photo-conductor sufficiently, it is necessary that it should be used in the state where it is formed in a uniform film.

Attempts have heretofore been made to obtain a thin film of lead monoxide by heating lead monoxide in vacuum to evaporate and deposit it on a glass or metal plate. However, according to such vacuum evaporation, metallic lead decomposed by heat is grows in lead monoxide, so that a deposited film of lead monoxide incorporated with metallic lead is obtained. Accordingly, in this conventional method, the film deposited through evaporation exibits a black color owing to the incorporation of metallic lead. A method in which a small amount of oxygen is made present in an atmsphere for the vacuum evaporation has been tried in order to reducing the incorporation of metallic lead. Also in this method, however, it is difficult to obviate the incorporation of metallic lead and the resulting film of lead monoxide exhibits a dark color tone. A thin film of lead monoxide incorporated with metallic lead does not show sufficient semiocnductive or photconductive properties because of influences of the incorporated metallic lead. Accordingly, such film of lead monoxide incorporared with metallic lead is heated in an oxygen atmosphere or in air to convert the metallic lead incorporated in the film to lead monoxide. This conversion method is effective when the film deposited through evaporation has a relatively small thickness, but in case the film has a relatively great thickness, it is difficult to oxidize sufficiently even metallic lead incorporated in the interior portion of the film and it is, therefore impossible to obtain a uniform film of lead monoxide. A film of lead monoxide incorporated with lead monoxide, obtained according to above mentioned vacuum evaporation method, has a lattce structure of the tetragonal system, and in case a film of lead monoxide of a lattice structure of the orthorhombic system is wanted, it is further retreated to effect the transition. However, also in this case, if the film deposited through evaporation has a relatively large thickness, it is difficult to retain the stoichiometric equilibrium uniformly throughout the interior of the film and hence, it is hardly possible to obtain a film of uniform lead monoxide having a lattice structure of the orthorhombic system.

SUMMERY OF INVENTION

It is a primary object of this invention to provide a process for the preparation of a film of lead monoxide of high purity by the vacuum evaporation method.

More specifically, we have made extensive research works with a view to developing a novel process according to which a film of lead monoxide of high purity substantially free from incorporated metallic lead, especially lead monoxide of the orthorhombic system, would be directly prepared only by the vacuum evaporation without conducting any post treatment after the vacuum evaporation treatment.

It has been found when lead monoxide is subjected to the vacuum evaporation in the presence of silicon dioxide, the above object can be attained fully. More particularly, when a mixture of lead monoxide with silicon dioxide is used as the starting material for the vacuum evaporation, decomposition of lead monoxide is prevented and, hence, growth of metallic lead is inhibited, with the result that a vacuum evaporation film of lead monoxide of high purity can be obtained. Further, there is obtained, according to this process, the lattice structure of the vacuum evaporation film of the orthorhombic system, and no special heat treatment is needed for the phase transition after the vacuum evaporation treatment. Thus, a film of lead monoxide having a lattice structure of better stoichiometric equilibrium state can be easily obtained according to this process, as compared with conventional techniques.

DETAILED DESCRIPTION OF INVENTION

In accordance this invention, there is provided a process for the preparation of a film of lead monoxide comprising subjecting lead monoxide to the vacuum evaporation in the presence of silicon dioxide.

Either lead monoxide of the tetragonal system or lead monoxide of the orthorhombic system can be used as the starting material for the vacuum evaporation. It is also possible to employ as the starting material a mixture of lead monoxide of the tetragonal system and lead monoxide of the orthorhombic system. In order to obtain a starting material composed of a mixture of lead monoxide with silicon dioxide, it is preferred that a mixture of lead monoxide and silicon dioxide is heated and molten to convert the mixture to a glassy homogeneous melt. In order to obtain such molten mixture promptly, it is preferable to employ lead monoxide and silicon dioxide in the powdery state. This heat-melting step can be conducted in air or oxygen gas, or an inert gas unreactive with the melt of lead monoxide and silicon dioxide. The amount of silicon dioxide to be incorporated in lead monoxide is not particularly critical in this invention, but it is generally preferred that silicon dioxide is incorporated in such an amount that the molten mixture of lead monoxide and silicon dioxide takes a glassy form and a melt of better quality can be obtained when silicon dioxide is incorporated in an amount of about 25 percent mole or more. It is preferred that a vessel to be used for the heat-melting and a boat for the starting material to be subjected to the vacuum evaporation are composed of material unreactive with the content, such as platinum alumina.

It is preferred that the vacuum evaporation carried out at a higher degree of vacuum, but it is sufficient that the pressure is as low as $5\times10^{-5}$ Torr. The starting material for the vacuum evaporation composed of a molten mixture of lead monoxide with silicon dioxide can retain the molten state at a relatively low temperature. Therefore, sufficient results can be obtained by conducting the vacuum evaporation at a temperature of 650° to 750° C. In other word, in this invention, it is possible to accomplish the vacuum evaporation at a temperature lower than the decomposition temperature of lead monoxide. A substratum on which lead monoxide is deposited by the vacuum evaporation can be optionally chosen depending on the intended use of the resulting film, and for instance, a glass plate and a metal plate can be used as such substratum. Since there is a fear that lead monoxide evaporated while being inhibited from decomposition adheres to an exposed high temperature portion of a heater or the like and is thermally decomposed to generate a vapor of metallic lead, it is preferred to provide a cover or the like on such high temperature portion. A film of lead monoxide obtained according to this invention is of the orthorhombic system characterized by a very high purity, but just after the vacuum evaporation treatment the stoichiometric equilibrium can be obtained insufficiently sometimes. In this case, however, only by the method that a man exposes the film to air for long time, a sufficient stoichiometric equilibrium state can be attained. In such case, of cause, it is possible to subject the film to a heat treatment in an oxygen gas. In case a film of lead monoxide having the lattice structure of tetragonal system is wanted, it is possible to obtain a film of lead monoxide having the intended lattice structure by heating the film deposited through the vacuum evaporation of the orthorhombic system at an elevated pressure under appropriate condictions to cause the phase transition.

According to the process of this invention, it is possible to a film of highly pure lead monoxide, especially highly pure lead monoxide of the orthorhombic system excellent in semiconductive or photo-conductive characterisrics, very easily at a very low cost without conducting any post treatment. The film obtained according to this invention, therefore, can be used conveniently in various application field as a detector for X-ray or high energy particles, a detector for visible and ultraviolet rays, a photo-conductive sheet for electrophotography, rectifier element, a thermoelectromotive element, a solar battery, etc.

This invention will now be Illustrated by reference to Examples, the scope of this invention is not limited by these Examples at all.

EXAMPLE 1

A mixture composed of 40 mole percent of powdery lead monoxide and 60 mole percent of powdery silicon dioxide was heated and molten in air on an alimina crusible to form a glassy molten mixture, and then it was cooled to obtain starting material for the vacuum evaporation. The so obtained starting material was placed in an alumina boat and the vacuum evaporation was conducted under the following conditions by employing as a substratum "Nesa" glass plate, an alumina plate and a brass plate, respectively;

| | |
|---|---|
| boat-heating temperature | about 700°C. |
| degree of vacuum | $2 \times 10^{-5}$ Torr. |
| distance between substratum and boat | 15cm |
| temperature of substratum | 100°C. |
| vacuum evaporation time | 10 minutes |

As a result, a film deposited through the vacuum evaporation of a thickness of about 1 micron having a clear yellow color was formed on each of the substrata used. When the resulting film were subjected to the chemical analysis, it was found that in each film the lattice structure was of the orthorhombic system.

When surfaces of these films were subjected to a corona discharge treatment, it was found that they were charged with about 10 V. When the so charged films were exposed to light emitted from a tungsten lamp of 100 W., it was observed that the charges on the films immediately disappeared.

EXAMPLE 2

A mixture composed of 70 mole percent of powdery lead monoxide and 30 mole percent of powdery silicon dioxide was heated and molten in air on a platinum crucible to form a glassy molten mixture, and then a molten mixture was cooled to obtain a starting material for the vacuum evaporation. then, the obtained starting material was placed in a platinum boat, and the vacuum evaporation was carried out under the following conditions by empolying Nesa glass and an aluminum plate as a substratum, respectively

| | |
|---|---|
| boat-heating temperature | about 750°C. |
| degree of vacuum | $3 \times 10^{-6}$ Torr. |
| distance between substratum and boat | 20 cm |
| temperature of substratum | 100°C. |
| vacuum evaporation time | 8 minutes |

As a result, a film deposited through vacuum evaporation of a thickness of abuot 1 micron having a clear yellow color was obtained on each of the substrata.

As the result of the chemical analysis X-ray diffraction analysis, it was found that each of these films, as same as films obtained in Example 1, was composed substantially of lead monoxide of the orthorhombic system.

What is claimed is:

1. A process for the production of a lead monoxide film comprising heating a starting material containing lead monoxide in the presence of silicon dioxide in an evaporation zone to a sufficient temperature to cause evaporation of said lead monoxide, and depositing said evaporated lead monoxide on a substrate located outside said zone.

2. A process according to claim 1 further comprising melting said starting material.

3. A process according to claim 1 wherein said lead monoxide and said silicon dioxide are in powdered form.

4. A process according to claim 1 wherein said silicon dioxide is present in an amount of at least 25 mole percent of said starting material.

5. A process according to claim 1 wherein said temperature is from 650° to 750°C.

6. A process according to claim 1 wherein said evaporation is carried out at less than atmospheric pressure.

7. A process according to claim 1 wherein said monoxide of lead is orthorhombic.

8. A process according to claim 7, wherein said starting material is prepared by melting and mixing said lead monoxide and said silicon dioxide.

9. A process according to claim 1, wherein said starting material further comprises said silicon dioxide.

10. A process according to claim 9, wherein said lead monoxide and said silicon dioxide used for the preparation of the starting material are individually in powdered form.

11. The product of the process of claim 1.

* * * * *